Aug. 7, 1962     M. SCOTT     3,048,453
BEARING AND SEAL ASSEMBLY
Filed Feb. 1, 1961
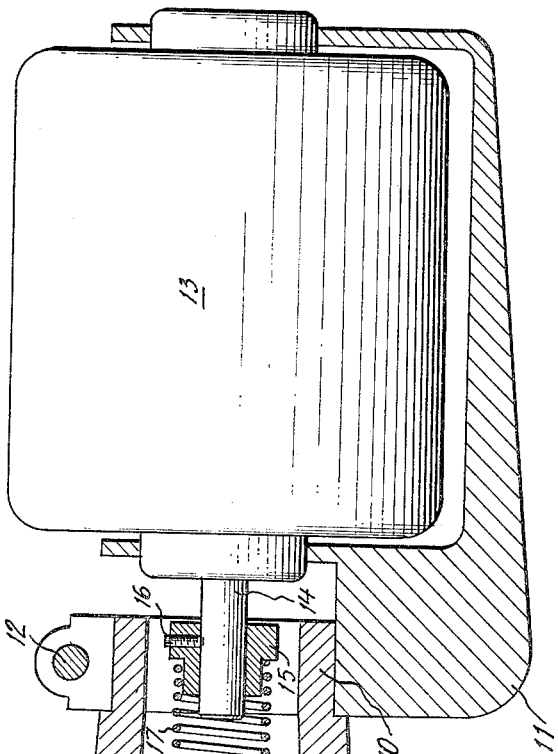
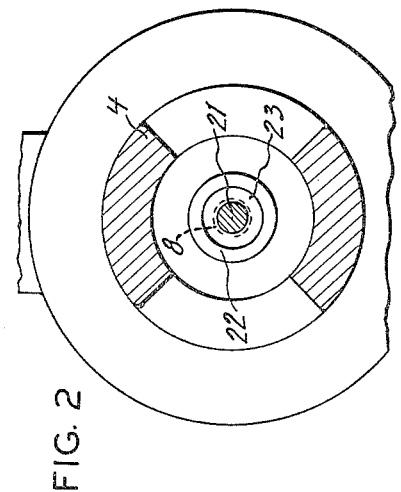
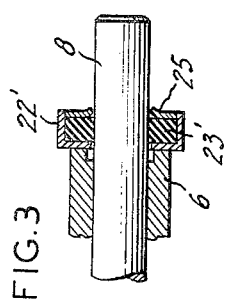
INVENTOR.
MARTIN SCOTT
BY
Bierman & Bierman
ATTORNEYS United States Patent Office 3,048,453
Patented Aug. 7, 1962

3,048,453
BEARING AND SEAL ASSEMBLY
Martin Scott, Valhalla, N.Y., assignor to Metallized Carbon Co., Inc., Ossining, N.Y., a corporation of New York
Filed Feb. 1, 1961, Ser. No. 86,406
7 Claims. (Cl. 308—36.2)

The present invention is directed to pumps and the like, and more particularly to a bearing and seal structure which will prevent or minimize leakage from said pump through the shaft thereof.

Heretofore, there have been made and used self-contained units consisting of a pump and electric motor in which the entire unit was sealed against the entrance of liquids. Provision was made for preventing leakage from the pump past the shaft and into the motor. However, the structures were complicated and consisted of a relatively large number of parts and were expensive. There was also proposed an arrangement wherein the shaft passed through a single bearing in the pump support and sealing means were interposed between the impeller and the support. This arrangement was disadvantageous in that leakage occurred due to wear and a relatively large number of parts were necessarily incorporated therein.

The present invention is intended and adapted to overcome the difficulties and disadvantages encountered in the prior art, it being among the objects of the invention to provide a bearing and seal assembly which is simple in construction and is composed of a relatively small number of necessary elements.

It is also among the objects of the invention to provide an assembly of the type described which is highly effective in use and which is adapted to eliminate leakage along the shaft.

It is further among the objects of the invention to provide a structure which minimizes wear of the elements, wherein the seal may be adjusted, and the replacement of parts is simple.

In practicing the present invention there is provided a pump and housing mounted on a support having a central opening through which the pump shaft extends. A pair of spaced bearings for the shaft are located in the opening adjacent to the ends of the housing, thus giving double support to the shaft. The bearing remote from the housing is provided with a seal in the form of a collar on the shaft and mounted to rotate with it. The collar has one face contacting with and sealing against the end of the bearing. There is also provided a resilient washer usually in the form of an O-ring which is held in a recess in the shaft and bears against the collar.

This O-ring has the functions of holding the seal collar in its proper position on the shaft, of sealing the clearances between the seal collar and the shaft to prevent leakage of liquid from the pump or entrance of air, and, due to the resilience of the O-ring, allows the seal collar to aline itself with the seal face of the stationary bearing. This maintains the seal even if in time the seal face should wear unevenly or if in the assembly of the elements it should not be exactly perpendicular to the shaft.

There is also provided spring means for transmitting rotation from the motor shaft to the pump shaft. It is a compression spring and maintains contact between the seal faces. If in time the seal faces wear down slightly or the spring weakens slightly causing leakage at the seal, there is provided means for re-setting the spring to increase the spring pressure back to normal.

The invention is more fully described in connection with the accompanying drawing constituting a part hereof and in which like reference characters indicate like parts, and in which FIG. 1 is a longitudinal cross-sectional view of a pump structure made in accordance with the present invention, some parts being shown in elevation;

FIG. 2 is a transverse cross-sectional view taken along line 2—2 of FIG. 1, and

FIG. 3 is a fragmentary longitudinal cross-sectional view, some parts being in section, showing a modified form of seal collar.

The pump has a housing 1 having inlet 2 and outlet 3. A support 4 for housing 1 has a central opening therein, into which are fitted bearings 5 and 6 separated by space 7. Shaft 8 operating in said bearings extends into pump housing 1 and has impeller 9 on the end thereof. Bearing 5 terminates at the pump end of support 4, and bearing 6 terminates beyond the opposite end of support 4. The rear of the support has a shoulder on which a support bracket 11 is clamped at 12. The driving motor 13 is held in the bracket.

Stub shaft 14 of motor 13 extends towards and in alinement with shaft 8. Coupling 15 is held on shaft 14 by set screw 16. A coil spring 17 has one end fixed on coupling 15 and the other end fixed on coupling 18, which is held by set screw 19 on end 20 of shaft 8. By these set screws the tension of spring 17 may be adjusted.

A recess or neck 21 in shaft 8 is adapted to hold O-ring 23 which in turn bears upon seal collar 22. Said collar is held sufficiently firmly so that it tends to rotate with shaft 8; thereby the collar will form a liquid-proof seal with the rear end of bearing 6. Said end of bearing 6 is undercut as shown at 24. By such arrangement the contact between the collar prevents leakages either in or out, at the rear end of bearing 6, and also along the shaft as O-ring 23 in recess 21 completely seals this area. Spring 17 is a compression spring so that it tends to compress O-ring 23 against collar 22 and also presses collar 22 against bearing 6.

Although the invention has been described setting forth a single specific embodiment thereof, such description is intended to illustrate the invention and not to limit it. Various changes in the details of construction may be made without departing from the principles set forth. For instance, any suitable type of pump may be used, the mounting of the motor may be altered, and the form, size and shape of the several elements are subject to change to suit the particular design desired. The invention may be used in conjunction with other devices than pumps. These and other changes may be made in such details, and the invention is to be broadly construed and not to be limited except by the character of the claims appended hereto.

For instance, referring to FIG. 3, the rotary seal at the end of bearing 6 is the same as in FIG. 1 except that there is provided a cup shaped rotary seal member 22' with a square rubber packing ring 23' having much greater frictional area than O-ring 23 which gives a more positive drive between shaft 8 and the seal collar. Also, instead of groove 21 in shaft 8 there is a self-locking retaining ring 25 having gripping prongs at the inner edge to take the thrust of the shaft against the seal, which also aids in driving the seal collar.

I claim:

1. A bearing and seal assembly comprising a housing a rotatable element therein, a support secured to said housing, a shaft for said element in said support and extending through said housing, a bearing for said shaft in said support adjacent to said housing, the end of said bearing remote from said housing extending beyond said support, said end being undercut adjacent to said shaft, a seal collar on said shaft abutting said end, an elastic annulus interposed between said collar and shaft to provide frictional engagement thereof, rotating means for said shaft flexibly connected thereto, and a compression spring biasing said shaft and collar against said bearing.

2. A bearing and seal assemly according to claim 1 characterized in that an O-ring of elastic material holds said collar in its operative position, and a recess in said shaft into which said O-ring fits.

3. A bearing and seal assembly according to claim 1 characterized in that said rotating means including a motor shaft in alinement with and adjacent to the end of said shaft, and a coil spring coupling said shafts.

4. A bearing and seal assembly according to claim 3 characterized in that coupling collars are mounted on the adjacent ends of said shafts, said spring having its ends attached to said collars.

5. A bearing and seal assembly according to claim 1 characterized in that said spring connects said shaft to said driving means.

6. A bearing and seal assembly according to claim 1 characterized in that said bearing is split with a space between the parts thereof.

7. A bearing and seal assembly according to claim 1 characterized in that said spring is provided with means for adjusting the compression thereof.

References Cited in the file of this patent

UNITED STATES PATENTS

| | | |
|---|---|---|
| 2,017,302 | Yoder | Oct. 15, 1935 |
| 2,179,824 | Kip | Nov. 14, 1939 |
| 2,640,736 | Wahlmark | June 2, 1953 |
| 2,764,100 | Maisch | Sept. 25, 1956 |

FOREIGN PATENTS

| | | |
|---|---|---|
| 656,855 | France | Jan. 7, 1929 |